(12) United States Patent
Pautot

(10) Patent No.: US 7,486,794 B2
(45) Date of Patent: Feb. 3, 2009

(54) DATA-PROCESSING ARRANGEMENT COMPRISING CONFIDENTIAL DATA

(75) Inventor: Fabrice Pautot, Montrouge (FR)

(73) Assignee: Gemalto SA, Meudon (FR)

( * ) Notice: Subject to any disclaimer, the term of this patent is extended or adjusted under 35 U.S.C. 154(b) by 659 days.

(21) Appl. No.: 10/332,118

(22) PCT Filed: Jul. 11, 2001

(86) PCT No.: PCT/IB01/01240

§ 371 (c)(1),
(2), (4) Date: Aug. 5, 2003

(87) PCT Pub. No.: WO02/09030

PCT Pub. Date: Jan. 31, 2002

(65) Prior Publication Data

US 2004/0133585 A1 Jul. 8, 2004

(30) Foreign Application Priority Data

Jul. 11, 2000 (FR) .................................. 00 09023

(51) Int. Cl.
*H04L 9/00* (2006.01)
(52) U.S. Cl. ............................ 380/263; 326/31; 326/33
(58) Field of Classification Search ................. 380/263; 326/31, 33
See application file for complete search history.

(56) References Cited

U.S. PATENT DOCUMENTS

| | | | | |
|---|---|---|---|---|
| 5,007,087 A * | 4/1991 | Bernstein et al. | ............... | 380/46 |
| 5,202,883 A * | 4/1993 | Hatherill et al. | ............. | 370/362 |
| 5,216,713 A * | 6/1993 | Lindholm | .................... | 380/207 |
| 5,473,694 A * | 12/1995 | Carroll et al. | ................ | 380/263 |
| 5,655,022 A * | 8/1997 | Carroll | ....................... | 380/263 |
| 5,680,462 A * | 10/1997 | Miller et al. | ................. | 380/263 |
| 5,729,607 A * | 3/1998 | DeFries et al. | .............. | 380/263 |
| 5,874,829 A * | 2/1999 | Holweg et al. | .............. | 323/274 |
| 5,930,364 A * | 7/1999 | Kim | ............................ | 380/28 |
| 6,049,614 A * | 4/2000 | Kim | ............................ | 380/263 |
| 6,064,701 A * | 5/2000 | Tresser et al. | ................ | 375/285 |
| 6,078,665 A * | 6/2000 | Anderson et al. | ............. | 380/28 |
| 6,104,703 A * | 8/2000 | Sobiski et al. | .............. | 370/252 |
| 6,127,899 A * | 10/2000 | Silva et al. | .................... | 331/78 |
| 6,178,217 B1 * | 1/2001 | Defries et al. | ............... | 375/377 |
| 6,212,239 B1 * | 4/2001 | Hayes | ........................ | 375/259 |
| 6,218,973 B1 * | 4/2001 | Barrett et al. | ............... | 341/143 |
| 6,276,609 B1 * | 8/2001 | Czar et al. | ................... | 235/492 |
| 6,282,292 B1 * | 8/2001 | Carroll | ........................ | 380/263 |

(Continued)

OTHER PUBLICATIONS

Ogorzalek, M.J., Galias, Z., Chua, L.O. [1993] "Exploring Chaos in Chua's Circuit Via Unstable Periodic Orbits," Proceedings of 1993 IEEE International Symposium on Circuits and Systems, vol. 4, pp. 2608-2611.*

(Continued)

*Primary Examiner*—David G Cervetti
(74) *Attorney, Agent, or Firm*—Pehr Jansson; The Jansson Firm

(57) ABSTRACT

A data-processing arrangement (3) comprises a data-handling circuit (4) and a supply-current circuit (8) whose dynamic behavior is inherently chaotic in the sense of Lyapunov. The data-processing arrangement is arranged so that a power supply current ($i_o$) consumed by the data-handling circuit flows through the supply-current circuit.

14 Claims, 3 Drawing Sheets

U.S. PATENT DOCUMENTS

| | | | | |
|---|---|---|---|---|
| 6,304,613 | B1* | 10/2001 | Koller et al. | 375/268 |
| 6,363,153 | B1* | 3/2002 | Parker et al. | 380/263 |
| 6,364,207 | B1* | 4/2002 | Thuringer et al. | 235/492 |
| 6,370,248 | B1* | 4/2002 | Carroll et al. | 380/263 |
| 6,417,497 | B2* | 7/2002 | Nomura et al. | 219/494 |
| 6,419,159 | B1* | 7/2002 | Odinak | 235/492 |
| 6,442,495 | B1* | 8/2002 | Fleming-Dahl | 702/69 |
| 6,498,404 | B1* | 12/2002 | Thuringer et al. | 307/32 |
| 6,507,130 | B1* | 1/2003 | Thuringer et al. | 307/70 |
| 6,567,752 | B2* | 5/2003 | Cusumano et al. | 702/34 |
| 6,606,526 | B1* | 8/2003 | Spano et al. | 700/91 |
| 6,611,794 | B1* | 8/2003 | Fleming-Dahl | 702/191 |
| 6,698,662 | B1* | 3/2004 | Feyt et al. | 235/492 |
| 6,704,420 | B1* | 3/2004 | Goedgebuer et al. | 380/263 |
| 6,725,374 | B1* | 4/2004 | Jahnich et al. | 713/190 |
| 6,744,893 | B1* | 6/2004 | Fleming-Dahl | 380/263 |
| 6,748,410 | B1* | 6/2004 | Gressel et al. | 708/491 |
| 6,779,730 | B2* | 8/2004 | Fletout et al. | 235/492 |
| 6,848,619 | B1* | 2/2005 | Leydier | 235/492 |
| 6,980,656 | B1* | 12/2005 | Hinton et al. | 380/263 |
| 6,980,657 | B1* | 12/2005 | Hinton et al. | 380/263 |
| 6,999,445 | B1* | 2/2006 | Dmitriev et al. | 370/342 |
| 7,003,048 | B1* | 2/2006 | Eibel et al. | 375/295 |
| 7,010,126 | B1* | 3/2006 | Kim | 380/263 |
| 7,017,048 | B2* | 3/2006 | Schneider et al. | 713/194 |
| 7,069,217 | B2* | 6/2006 | McLaughlin et al. | 704/269 |
| 7,110,547 | B2* | 9/2006 | Short | 380/263 |
| 7,245,723 | B2* | 7/2007 | Hinton et al. | 380/263 |
| 2001/0024313 | A1* | 9/2001 | Bauer et al. | 359/265 |
| 2002/0035651 | A1* | 3/2002 | Langton | 710/5 |
| 2002/0054682 | A1* | 5/2002 | Di Bernardo et al. | 380/263 |
| 2002/0154769 | A1* | 10/2002 | Petersen et al. | 380/42 |
| 2005/0134409 | A1* | 6/2005 | Gandhi | 333/217 |
| 2006/0072754 | A1* | 4/2006 | Hinton et al. | 380/263 |
| 2008/0008320 | A1* | 1/2008 | Hinton et al. | 380/263 |

OTHER PUBLICATIONS

Lozi, R. [1995] "Secure communications via chaotic synchronization in Chua's circuit and Bonhoeffer-Van der Pol equation: numerical analysis of the errors of the recovered signal," 1995 IEEE International Symposium on Circuits and Systems (Cat. No. 95CH35771). IEEE. Part vol. 1, pp. 684-687.*

Sanchez, E., Matias, M.A., Perez-Munuzuri, V. [2000] "Chaotic synchronization in small assemblies of driven Chua's circuits," IEEE Transactions on Circuits & Systems I-Fundamental Theory & Applications, vol. 47, No. 5, pp. 644-654.*

Itoh, M., Murakami, H., Chua, L.O. [1994] "Performance of Yamakawa's chaotic chips and Chua's circuits for secure communications," 1994 IEEE International Symposium on Circuits and Systems (Cat. No. 94CH3435-5). IEEE. Part vol. 6, pp. 105-108.*

Yang, T., Y., Chua, L.O. [1997] "Impulsive stabilization for control and synchronization of chaotic systems: theory and application to secure communication," IEEE Transactions on Circuits & Systems I-Fundamental Theory & Applications, vol. 44, No. 10, pp. 976-988.*

Parker, T.S., Chua, L.O., INSITE—A software toolkit for the analysis of nonlinear dynamical systems, Aug. 1987, Proceedings of the IEEE, vol. 75, Issue 8, pp. 1081-1089.*

Suykens et al.,n-Double scroll hypercubes in 1D-CNNs, 1996, International Journal of Bifurcation and Chaos vol. 7, issue:8 pp. 1873-1885.*

J. C. Sprott, Simple chaotic systems and circuits, University of Wisconsin, Madison, Nov. 29, 1999, American Association of Physics Teachers.*

Ling Cong, Design and Realization of an FPGA-Based Generator for Chaotic Frequency Hopping Sequences, Jun. 2000, IEEE.*

Chua, L.O. et al, "Canonical Realization of Chua's Circuits Family", 1990, IEEE Transactions on Circuits and Systems, vol. 37(7), p. 885-902.

Brucoli, M. et al, "Synchronization of Hyperchaotic Circuits Via Continious Feedback Control with Application to Secure Communications", International Journal of Bifurcation and Chaos, vol. 8, No. 10, 1998, p. 2031-2040.

Caponetto et al, "Programmable Choas Generator, based on Cellular Neural Network with Applications in Chaotic Communications", Fifth IEEE International Workshop on Cellular Neural Networks and their Applications, London, Apr. 1998.

Suykens, J.A. et al, "n-Double Scroll Hypercubes in 1-d CNN's", The International Jouranl of Bifurcation and Chaos, vol. 7 No. 8, 1997, p. 1873-1885.

Arena, P et al, "Bifurcation and Chaos in Noninterger Order Cellular Neural Network", The International Journal of Bifurcation and Chaos, vol. 8 No. 7, 1998, p. 1527-1539.

Krasichkov, V, "Filtering of Chaotic Oscillations: Effect of Transfer Function", The Proceedings of the Fifth Conference of NonLinear Dynamical Systems, Moscow, 1997, p. 464-468.

Alexeyev, A.A. et al, "Secure Communications Based on Variable Topology of Chaotic Circuits", The International Journal of Bifurcation and Chaos, vol. 7 No. 12, 1998, p. 2862-2869.

Kipchatov et al, "Creation of High-dimensional Oscillations from Low-dimensional Systems", The International Conference on Dynamical Systems and Chaos, Singapore, World Scientific, vol. 2., p. 359-362, 1995.

* cited by examiner

DATA-PROCESSING ARRANGEMENT COMPRISING CONFIDENTIAL DATA

FIELD OF THE INVENTION

The present invention relates to a data-processing arrangement comprising confidential data. Such a data-processing arrangement may be, for example, a smart card or a micro-controller to be incorporated within a smart card.

Smart cards are standardized items generally used in applications in which secure storage and processing of confidential data is essential. They are more specifically intended to applications in the field of health, of pay per view TV applications, and also banking applications, for example, such as the electronic purse.

BACKGROUND OF THE INVENTION

Defrauders have developed so-called current-based attacks in order to obtain information about confidential data handled by smart card micro-controllers. These are, for example, keys for executing encryption algorithms implemented within the micro-controllers, such as algorithms known as the DES (DataEncryption Standard) or RSA (Rivest Shamir Adleman) algorithms or portions of the code executed by said micro-controllers.

These attacks are based upon the following principle. The current i(t) used by the micro-controller which, over a time interval T, executes an instruction INS is a function of operands OPE handled by said instruction INS.

In order to carry out current-based attacks, defrauders may in particular connect a resistor R having a small resistance, for instance of 1 Ω in series between a power-supply source and a power-supply terminal of the smart card. They then display a signal which represents variations in the current i(t) used by the micro-controller as a function of time. This signal is obtained in response to the micro-controller executing several hundreds or even several thousands of instructions applied to identical operands, be they similar or different. The instructions derive from APDU (Application Data Unit) commands, which are described in the IO 7816 standard. The ADPU commands are transmitted to the micro-controller by means of a computer equipped with a reader. This computer is also connected, for example, to a digital oscilloscope which samples variations in the current i(t) used by the micro-controller and digitizes the obtained results for subsequent analysis. According, it is possible to retrieve secret information contained in a smart card.

Micro-controller manufacturers and smart card manufacturers have developed methods for securing these devices against current-based attacks. A known method consists in adding some form of random noise to the current consumed by the micro-controller. However, this countermeasure is not sufficiently immune to statistical attacks such as DPA (Differential Power Analysis) or IPA (Inferential Power Analysis).

SUMMARY OF THE INVENTION

It is an object of the invention to provide enhanced security against so-called current-based attacks.

To that end, the invention provides a data-processing arrangement as defined in claim 1.

Other features and advantages of the invention will become apparent in the following description of the invention described by way of non-limiting examples in reference to the appended figures.

DETAILED DESCRIPTION

Figure 1:
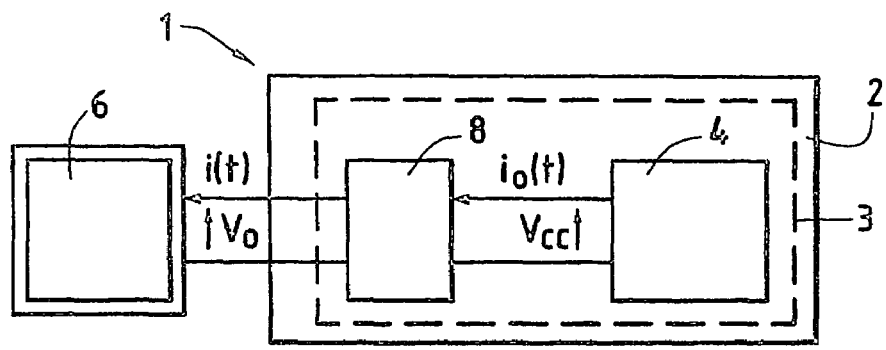
FIG. 1 shows a smart card according to the invention, with a card reader.

An exemplary implementation of the invention is shown in FIG. 1.

In this figure, reference numeral 1 designates a micro-controller card. Such a card 1 includes a card body 2 and a micro-controller 3. This micro-controller 3 is incorporated within card body 2. It comprises five contact terminals, namely the VCC, RST, CLK, I/O and GND terminals. Terminal VCC is a power supply terminal for supplying power to the micro-controller, terminal RST is a reset terminal for transmitting a reset signal to the micro-controller, terminal CLK is a clock terminal for transmitting a clock signal to the micro-controller, terminal I/O is an input/output terminal for allowing logical data exchanges to take place between the micro-controller and the outside world, and terminal GND is a grounding terminal for grounding the micro-controller. These terminals are electrically connected, via electrical connection means, to an antenna embedded within card body 2 or/and to contact pads flush with the surface of said body 2.

Micro-controller 3 comprises a data-managing operative portion 4 and an interface portion which is not operatively involved with data management.

Operative portion 4, or the operative micro-controller, advantageously comprises all, but also sometimes a portion, of the sub-units, of which CMOS (Complimentary Metal-Oxide Semiconductor) inverters are for managing confidential data. Therefore, it forms a part of the micro-controller able to deliver information pertaining to confidential data managed thereby. In practice, this operative portion may comprise the central processing unit, CPU, possibly an encryption processor associated with this unit, data and address bus control circuits, as well as RAM (Random Access Memory), ROM (Read-Only Memory) and EEPROM (Electronically Erasable Programmable Read-Only Memory) memories or any other kind of memory. It can also comprise portions which are not operatively involved in data management.

The interface portion comprises means which use a portion of the power that is not capable of revealing information about data processed by the micro-controller. It may comprise, for example, a charge pump, or interface circuits associated with the RST, CLK and I/O terminals. As far as the RST terminal is concerned, in particular, these means can be means for detecting the initialization signal of the micro-controller and of associated means. Regarding the CLK terminal, they can be, in particular, means for detecting frequencies ranging from a lower limit to an upper limit. Finally, regarding the I/O terminal, they are means for enabling the micro-controller to communicate by switching from an input to an output mode.

According to the invention, micro-controller 3 comprises a cryptosystem 8. This cryptosystem 8 is incorporated within micro-controller 3, by being interposed between the reader 6 of card 2 and its operative portion 6. A power supply voltage $V_0$ which, in practice, is constant, is input to micro-controller 3 and a power supply voltage $V_{CC}$ is input to the operative portion of micro-controller 3. The current used by micro-controller 3, measured at its output, is designated i(t) and the current used by its operative portion 4 is designated $i_0(t)$.

The cryptosystem 8 according to the invention encrypts variations in the current $i_0(t)$ used by the operative portion 4 of micro-controller 3.

Advantageously, cryptosystem 8 encrypts these variations through chaotic modulation. This cryptosystem 8 is therefore chaotic and forced by the current $i_0(t)$ used by the operative portion 4 of micro-controller 3.

The book by M. J. Ogorzalec, entitled "Chaos and Complexity in Nonlinear Electronic Circuits", published in the World Scientific Series on Nonlinear Science, publisher Leon O. Chua, 1997, ISBN 981-02-2873-2, gives a general description of chaotic systems as well as the principle of chaotic modulation. In particular, such systems are unstable in the sense of Lyapunov, in that they show the so-called property of being sensitive to initial conditions. Thus, any error on initial conditions or, more generally, any system perturbation, is exponentially amplified with time so that, after a certain time duration, known as the Lyapunov time, it is no longer possible to predict the system's state. Thus, regarding the problem to be solved by this invention, chaotic systems show particularly interesting properties: not only do they act as noise amplifiers but also, if the micro-controller executes the same series of instructions several times, which instructions correspond to the same current $i_0(t)$ used by its operative portion, the measured signals $i_0(t)$ are each time completely different from one another, so that statistical attacks can be counteracted.

In other words, when cryptosystem 8 is chaotic in the sense of Lyapunov, the information contained in the used current $i_0(t)$, be it amplitude information or frequency information, disappears from the output signal i(t). However, since the system is deterministic, this means that this information cannot be found from output signal i(t). This only means that this information is concealed.

Figure 2:
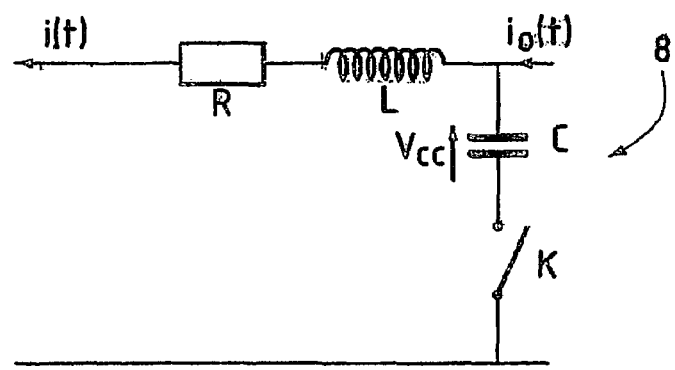
FIG. 2 shows a cryptosystem or a subsystem of this cryptosystem according to the invention.

An exemplary particularly simple time-continuous forced chaotic cryptosystem is shown in FIG. 2. This cryptosystem, or else any of its subsystems, comprise an RLC a resonant circuit consisting of a resistor (R), an inductor (L), and a capacitor (C)) oscillator with voltage control switching. In such a system, a switch K is voltage controlled. If supply voltage $V_{CC}$ is larger than a threshold voltage $V_{th}$, then K is ON. Otherwise, K is OFF.

When K is ON, the system is generally described by a state equation of the following kind:

$$\frac{dZ}{dt}(t) = AZ(t) + Bi_0(t) \quad (1)$$

and by an output equation of the following kind:

$$i(t) = {}^tCZ(t) \quad (2)$$

where $$A = \begin{pmatrix} 0 & 1 \\ -\frac{1}{LC} & -\frac{R}{L} \end{pmatrix}, B = \begin{vmatrix} 0 \\ \frac{1}{LC} \end{vmatrix} \text{ and } C = \begin{vmatrix} 1 \\ 0 \end{vmatrix}$$

When K is OFF, then $i(t)=i_0(t)$.

For an input current of the form $i_0(t)=A_m+A_0 \cos \omega_0 t$, with $A_m=15$ mA, $A_0=10$ mA, $\omega_0=2\pi\times3,57$ Mrad$\times$s$^{-1}$, R=0 Ω, L=1 μH, C=5 nF and $V_{th}=4,9$ V, i(t) is chaotic with 4.5 V<<$V_{CC}$<<5.5 V, $V_{CC}$ thus remaining within the usual voltage range of the operative micro-controller portion of a smart card.

In another example, the cryptosystem, or else, any of its subsystems, is composed of Chua's circuits. Such circuits are more particularly described in L. O. Chua et al., "Canonical Realization of Chua's circuits family", 1990, IEEE Transactions on Circuits and Systems, Vol. 37(7), p. 885-902.

The geometrical dimension of cryptosystem 8 is greater or equal to two. It is preferably of a large dimension, specifically, greater than four or five, so that the cryptosystem is as chaotic as possible, and in particular, hyperchaotic. Such high-dimensional cryptosystems can be obtained from a plurality of simple chaotic subsystems with a geometrical dimension of two or three.

Figure 3:
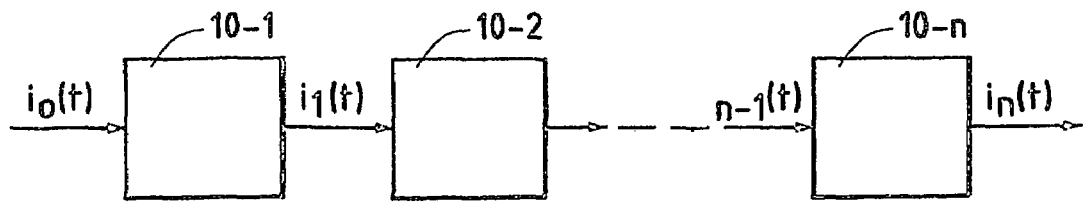
FIGS. 3, 4 and 5 illustrate different coupling variants between simple chaotic subsystems.
Figure 4:
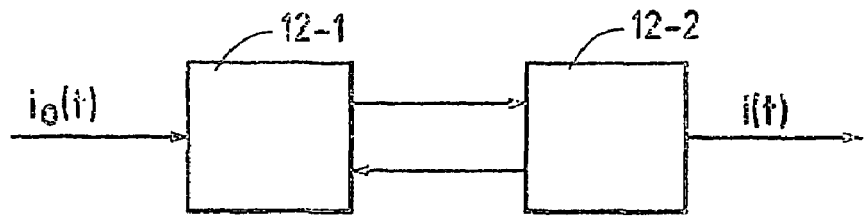

These simple chaotic subsystems, shown by reference numerals 10-1, 10-2, ... or 10-n in FIG. 2, 12-1 or 12-2 in FIG. 3, or else, 14-1, 14-2, ... or 14-16 in FIG. 4, can be coupled according to different variations.

According to a first variation shown in FIG. 3, a cryptosystem 8 is obtained from a plurality of n simple chaotic subsystems 10-1, 10-2, ... , 10-n which are unidirectionally cascade-coupled. Output $i_i(t)$ of a system 10-i is applied to the input of subsystem 10-i+1, thus forcing said subsystem 10-i+1, while subsystem 10-1 is forced by the current used by the micro-controller's operative portion. Then, the geometrical dimension of cryptosystem 8 is equal to the sum of the geometrical dimensions of each of the subsystems.

According to a second variation illustrated in FIG. 4, a high-dimensional cryptosystem 8 is obtained from two bidirectionally coupled subsystems 12-1 and 12-2. Such a bidirectional coupling of simple chaotic subsystems, allowing a six-dimensional hyperchaotic system to be obtained is described in "Synchronization of Hyperchaotic Circuits via Continuous Feedback Control With Application to Secure Communications", International Journal of Bifurcation and Chaos, Vol. 8, No 10 (1998), p. 2031-2040, M. Brucoli et al.

Figure 5:
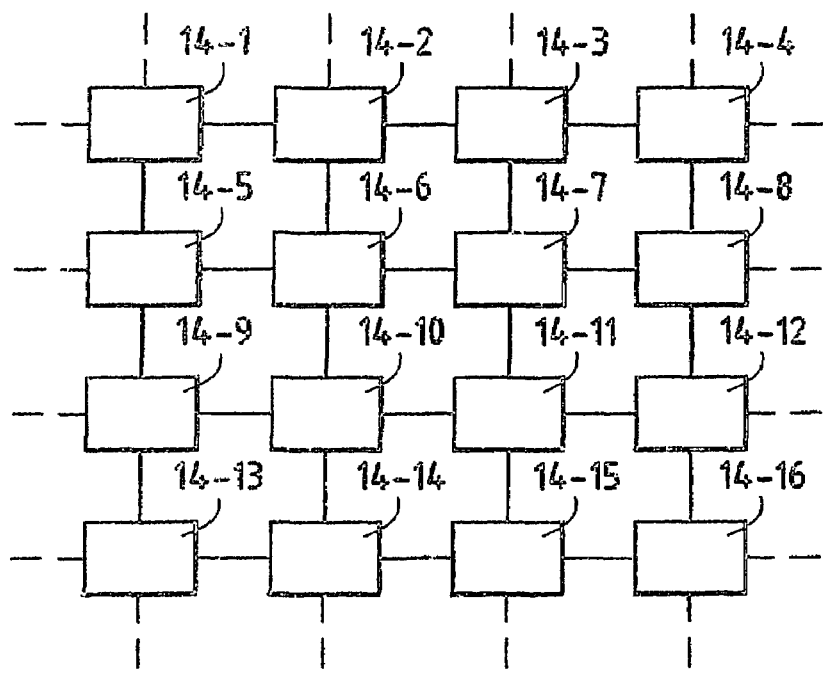

According to a third variation shown in FIG. 5, a high-dimensional cryptosystem 8 is obtained from n identical subsystems 14-1, ... , 14-n networked together so that each subsystem is coupled, in a unidirectional or bidirectional way, to m other subsystems, where m is a number at least equal to three and which is set to four in the example of FIG. 5. It should be noted that an arrangement of network-mounted simple chaotic subsystems is described in Caponetto et al., "Programmable Chaos Generator, based on Cellular Neural Network, with applications in Chaotic Communications", 1998, Fifth IEEE International Workshop on Cellular Neural Networks and their Applications, London, 14-17 April 1998, as well as in J. A. Suykens et al., "n-Double Scroll Hypercubes in 1-D CNNs", published in the International Journal of Bifurcation and Chaos, Vol. 7, N° 8 (1997), p. 1873-1885.

Moreover, the cryptosystem according to the invention may include different means for increasing its chaotic properties. Such properties can also be quantified in different ways and connected to the residual information amount contained in signal i(t).

Figure 6:
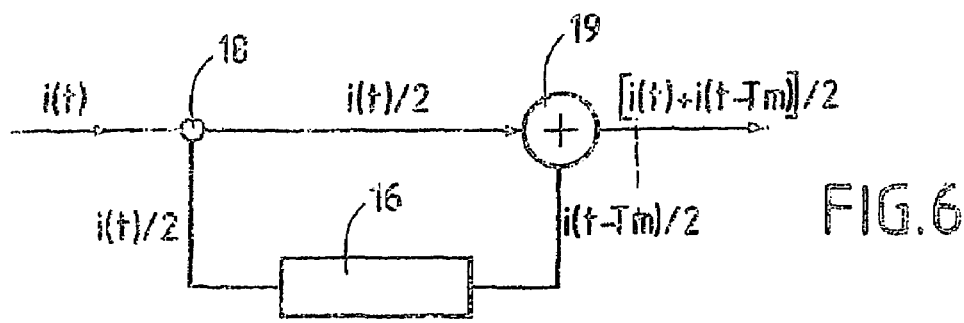
FIGS. 6, 7 and 8 show different means for enhancing the chaotic properties of a cryptosystem according to the invention.

A first means is described in an article by Kipchatov et al., "Creation of High-dimensional Oscillations from Low-dimensional Systems", in Proceedings of the International Conference on Dynamical Systems and Chaos, Singapore, World Scientific, Vol. 2, p. 359-362, 1995. It is based upon the following principle: the autocorrelation function of the used current i(t) shows minima for given time shifts; if $T_m$ is the time shift for one of those minima, then signal $$i'(t) = \frac{i(t) + i(t - T_m)}{2}$$

is dynamically much more complex than i(t). It is therefore desired to obtain a cryptosystem 8 that implements function i'(t). In practice, and as illustrated in FIG. 6, a circuit is made for that purpose, and comprises a delay line 16, a current divider 18 and a current adder 19.

A second means for obtaining highly chaotic systems uses a system having derivatives of non integer orders. This method is described in an article by P. Arena et al, "Bifurcation and Chaos in Noninteger Order Cellular Neural Network". Systems implementing this second method are intrinsically more chaotic than more conventional systems with integer order derivatives. This will then be referred to as γ-chaos.

Figure 7:
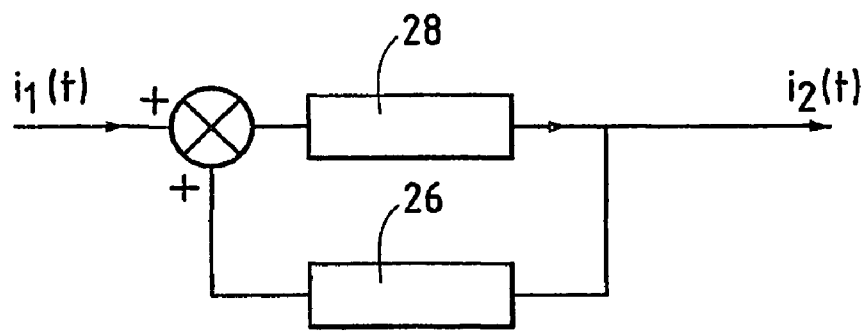

A third means for making a cryptosystem 28 or a subsystem of such a cryptosystem more unstable and therefore more chaotic is such that it includes, across the terminals of this cryptosystem 28, a positive feedback element 26 intended to be a part of a feedback loop which, in this cryptosystem, will be a positive feedback loop. This third means is shown in FIG. 7.

Figure 8:
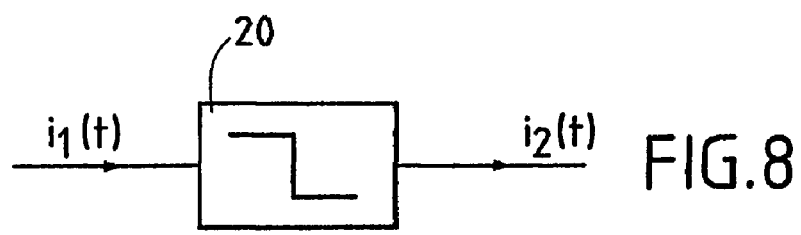

Finally, according to a fourth means, a chaotic signal $i_1(t)$ can be applied to a low-pass filter 20 such as the one shown in FIG. 8. Then, the obtained signal $i_2(t)$ will become more chaotic with lower filtering. Such a system has the following two advantages. On the one hand, it is a simple means of obtaining highly chaotic signals. On the other hand, someone attempting to perform an attack on the system, who would try to low-pass filter signals because of the noise they appear to contain, would himself or herself contribute in making this signal even more chaotic. This phenomenon is known as superfractalization. It is described, in particular, in an article by V. Krasichkov, "Filtering of Chaotic Oscillations: Effect of Transfer Function", published in the Proceedings of the Fifth Conference of Non-linear Dynamical Systems, Moscow, 1997, pages 464-468.

Cryptosystem 8 according to the invention has the further advantage of being stochastic. Thus, it not only comprises means for chaotic modulation encryption of variations in the current $i_0(t)$ used by the operative portion of micro-controller 4, but it also changes in time in a random manner.

According to a first embodiment, cryptosystem 8 comprises means for making at least one the parameters which determine its underlying equations stochastic.

In practice, these parameters are made stochastic by causing the physical characteristic values of one or more electronic components that compose the cryptosystem to become more stochastic. The range in which the stochastic parameters vary is chosen so that, within said range, the cryptosystem will always be chaotic.

In addition, various criteria are advantageously applied so as to choose the parameter(s) from those which determine equations that govern the cryptosystem 8 according to the present invention.

A first criterion for selecting the parameter to be made stochastic consists in adapting the one for which, within the allowable variation range, the dynamical cryptosystem undergoes the largest number of bifurcations. Thus, within this range, when the parameter varies, a plurality of cryptosystems with totally different properties are obtained.

A second criterion for selecting the parameter is to take the parameter(s) which define(s) the, or one non-linearity in the cryptosystem.

A third criterion for choosing the parameter is to choose the one which shows or can show the fastest variations in time within its variation interval, which variations can be induced.

In the exemplary system shown in FIG. 2, the parameters that can be made stochastic are R, L, C and $V_{th}$, where $V_{th}$ defines the cryptosystem's non-linearity.

In order to make a parameter stochastic, one may use, in particular, an analog noise source. For example, this noise is a thermal noise measured across an open-circuit resistor in the micro-controller or a semiconductor junction noise across a diode.

Figure 9:
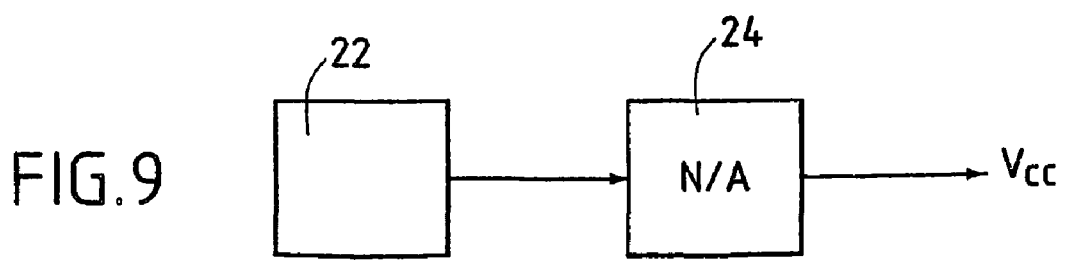
FIG. 9 is a schematic drawing of a system for generating a random signal.

However, use can also be made of a device of the kind shown in FIG. 9, which is composed of a random number generator 22 and a digital-to-analog converter 24. This generator 22 can also be applied to any parameter of a device described in connection with one of FIGS. 2 to 8. Preferably, in an application dedicated to smart cards, one can use the random number generator included in the operative portion 4 of micro-controller 3.

In another embodiment of the present invention, the equations underlying cryptosystem 8 according to the invention are themselves made stochastic.

For this purpose, it is possible to permanently modify the topology of circuits 8, for example by means of switches. Such a technique has already been described in a document by A. A. Alexeyev et al., entitled "Secure Communications Based on Variable Topology of Chaotic Circuits", published in the International Journal of Bifurcation and Chaos, Vol. 7, N° 12, p. 2862-2869, 1997. However, the application according to this article mainly relates to encryption and information is concealed at the output of the circuit, but does not disappear as in the present invention.

Finally, according to the present invention, the information originally present within the output admittance signal $i_0(t)$ of the operative portion 4 of said micro-controller 3 can be made to disappear from the output current i(t) used by micro-controller 3. Due to the combination of the applied chaotic and stochastic processings, which cannot be separated because of non-linearity, signal $i_0(t)$ can no longer be retrieved from an output signal i(t), as the amounted mutual information between signals $i_0(t)$ and i(t) can be highly reduced.

The decription hereinbefore illustrates the following basic features. A data-processing arrangement (3) comprises a data-handling circuit (4) and a supply-current circuit (8) whose dynamic behavior is inherently chaotic. The data-processing arrangement is arranged so that a power supply current ($i_o$) consumed by the data-handling circuit flows through the supply-current circuit.

The various embodiments, variations, or examples presented here demonstrate that it is possible to implement a very efficient countermeasure by means of a simple low-cost electronic device. Moreover, this countermeasure, the logical part of the smart card can be preserved.

Thus, it is no longer possible to access data managed by the operative portion of the micro-controller based on the measured variations in the current i(t) used by the micro-controller without previously having to decrypt said variations.

Preferably, the cryptosystem comprises means for encrypting the current used by the data managing operative portion of the micro-controller through a chaotic modulation. Advantageously, the cryptosystem is a time continuous non linear chaotic system forced by current $i_0(t)$ of geometric dimension, that is having a dimension in the phase space, which is greater or equal to two.

In the previous section, as well as in the following description, the terms "chaos" and "chaotic" are assumed to mean "chaos in the sense of Lyapunov" and "chaotic in the sense of Lyapunov", respectively.

By virtue of the properties of chaotic dynamic systems, the information contained in the variations of the current $i_0(t)$ used by the operative portion of the micro-controller disappears from the measured signal, be it amplitude information or frequency information, since the used current $i_0(t)$ is entirely transformed by the cryptosystem. Therefore, it is no longer possible, or at least it becomes difficult, to retrieve this information. More specifically, for decrypting the observed signal and solve the original problem, the defrauder should first identify the chaotic system used by determining its underlying equations as well as the parameters defining said equations, and then reconstruct the variations in the current used by the operative portion of the micro-controller from the variations in the measured current used by the micro-controller, by artificially inverting the cryptosystem. But, due to the intrinsic noise of electric systems, errors on the rated values of electronic components, which are due to manufacturing defects, and measurement limitations, if the cryptosystem is sufficiently chaotic, not only can its identification become problematic, but the decryption process itself, namely the reconstruction of the cryptosystem state at each time point, can be impossible in practice. In this respect, it should be noted that those skilled in the art of dynamic encryption usually try to implement cryptosystems as chaotic as possible in order to obtain a maximum security level, but it is then quite often impossible to decrypt the signals without introducing, for example, feedback loops between the transmitter and the receiver.

On the other hand, cryptosystems according to the present invention advantageously require as little energy as possible. Therefore, the cryptosystem is more chaotic and the encryption of the input signal is still improved.

The chaotic cryptosystem according to the invention may comprise one or a plurality of simple, possibly identical, forced chaotic subsystems, namely ones having a geometric dimension equal to two or three. One of those subsystems is forced by the current used by the micro-controller's operative portion.

According to a first modification, these simple chaotic subsystems are cascade-mounted and coupled unidirectionally.

According to a second modification, at least two simple chaotic subsystems are coupled bidirectionally.

According to a third modification, these subsystems are networked together. In this case, each subsystem is coupled, on average, to a plurality of other subsystems, at least three of them.

For the decryption of the current i(t) used by the micro-controller to be impossible in any case, the cryptosystem according to the invention is also preferably "stochastic". In other words, it randomly changes with time.

In the following description, the term "stochastic" encompasses the meanings of the terms "stochastic" and "pseudo-stochastic" and the term "random" encompasses the meanings of the terms "random" and "pseudo-random".

In one embodiment of a stochastic cryptosystem, the cryptosystem comprises means for making at least one of the parameters governing its underlying equations stochastic. In practice, these parameters are made stochastic by making the values of the physical characteristic of the electronic components constituting the cryptosystem stochastic. In order to do so, the cryptosystem for instance includes a random number generator or a noise generator.

Thus, even if the construction of the cryptosystem is perfectly known by those attempting to reconstruct the information contained within the admittance of the micro-controller's operative portion from measured used current signals, the decryption process is no longer possible. Accordingly, even if the equations and the nominal parameters of the cryptosystem are known by defrauders with any given accuracy, for example by collusion or reverse engineering, the state of said cryptosystem, which changes stochastically, cannot be reconstructed at any given time. For this to be done, it would have been required to know the value of the current used by the micro-controller's operative portion at any given time, but this is the very unknown to be found. In other words, from an encryption point of view, the cryptosystem encrypts non only the current used by the operative portion of the micro-controller through chaotic modulation, but also the stochastic processes governing the parameter values through the parameter modulation method. Therefore, it is impossible to separate, within the measured signals, the contribution of the current used by the micro-controller's operative portion from the stochastic processes. In addition, the contribution of stochastic processes, which is a function of their sensitivity to the parameters, is generally much larger than that of the current used by the micro-controller's operative portion, which is a function of initial conditions.

The micro-controller according to the present invention therefore now resists so-called white-box attacks since the number of unknowns is strictly greater than the number of equations relating them to each other.

Such a cryptosystem thus protects irremediably the information contained within the confidential data handled by the secure operative portion of the micro-controller.

In another embodiment according to the invention, the equations which determine the cryptosystem are themselves made stochastic. In such a case, the topology of the electronic circuit implementing the cryptosystem is made stochastic, for example, by means of switches.

The invention claimed is:

1. A data-processing device comprising:
   power supply connections;
   a data-handling circuit;
   a supply-current circuit connected to the data-handling circuit and the power supply connections, the supply-current circuit being operable to have a dynamic behavior inherently chaotic in the sense of Lyapunov so that a power supply current consumed by the data-handling circuit produces a chaotic power consumption at the power supply connectors.

2. A data-processing device according to claim 1, wherein the supply-current circuit comprises a plurality of sub-circuits, two or more of whose dynamic behavior is inherently chaotic in the sense of Lyapunov.

3. A data-processing device according to claim 2, wherein the sub-circuits are cascade coupled.

4. A data-processing device according to claim 2, wherein the sub-circuits are coupled so that they constitute a multi-dimensional network.

5. A data-processing device according to claim 2, wherein a sub-circuit belongs to Chua's circuit family.

6. A data-processing device according to claim 2, wherein a sub-circuit comprises an RLC (Resistor-Inductor-Capacitor) oscillator with voltage-controlled switching.

7. A data-processing device according to claim 1, wherein one or more of the components of the supply-current circuit are made stochastic.

8. A data-processing device comprising a data-handling circuit and a power-supply circuit, the power-supply circuit further comprising a supply-current circuit whose dynamic behavior is inherently chaotic in the sense of Lyapunov, wherein the power supply current to the data-handling circuit flows through the supply-current circuit so that the power supply current becomes chaotic in the sense of Lyapunov.

9. A data-processing device according to claim 8, wherein the supply-current circuit comprises a plurality of sub-circuits, two or more of whose dynamic behavior is inherently chaotic in the sense of Lyapunov.

10. A data-processing device according to claim 9, wherein the sub-circuits are cascade coupled.

11. A data-processing a device according to claim 9, wherein the sub-circuits are coupled so that they constitute a multi-dimensional network.

12. A data-processing device according to claim 9, wherein a sub-circuit belongs to Chua's circuit family.

13. A data-processing device according to claim 9, wherein a sub-circuit comprises an RLC (Resistor-Inductor-Capacitor) oscillator with voltage-controlled switching.

14. A data-processing device according to claim 8, wherein one or more of the components of the supply-current circuit are made stochastic.

* * * * *